(12) United States Patent
Hu et al.

(10) Patent No.: US 12,474,838 B2
(45) Date of Patent: Nov. 18, 2025

(54) MEMORY WITH REDUNDANT REPLACEMENT RESOURCES AND ELECTRONIC DEVICE

(71) Applicant: XC MEMORY CO., LTD, Zhuhai (CN)

(72) Inventors: Hong Hu, Beijing (CN); Yu Du, Beijing (CN)

(73) Assignee: XC MEMORY CO., LTD, Zhuhai (CN)

( * ) Notice: Subject to any disclaimer, the term of this patent is extended or adjusted under 35 U.S.C. 154(b) by 0 days.

(21) Appl. No.: 18/393,803

(22) Filed: Dec. 22, 2023

(65) Prior Publication Data

US 2024/0427495 A1 Dec. 26, 2024

(30) Foreign Application Priority Data

Jun. 26, 2023 (CN) .......................... 202310760113.0

(51) Int. Cl.
*G06F 3/06* (2006.01)

(52) U.S. Cl.
CPC .......... *G06F 3/0613* (2013.01); *G06F 3/0631* (2013.01); *G06F 3/0673* (2013.01)

(58) Field of Classification Search
CPC .... G06F 3/0613; G06F 3/0631; G06F 3/0673; G11C 29/76; G11C 29/808; G11C 29/81; G11C 29/4401
See application file for complete search history.

(56) References Cited

U.S. PATENT DOCUMENTS

| | | | | |
|---|---|---|---|---|
| 2001/0016893 A1* | 8/2001 | Merritt | .................... | G11C 29/81 710/22 |
| 2002/0159317 A1* | 10/2002 | Lammers | ................ | G11C 29/70 365/200 |
| 2008/0316824 A1* | 12/2008 | Park | ..................... | G11C 11/5642 365/185.11 |
| 2010/0232240 A1* | 9/2010 | Norman | .................... | G11C 5/02 365/63 |

(Continued)

FOREIGN PATENT DOCUMENTS

| | | |
|---|---|---|
| CN | 1112706 C | 6/2003 |
| CN | 101399088 A | 4/2009 |
| CN | 101833992 A | 9/2010 |

(Continued)

OTHER PUBLICATIONS

Chinese First Office Action, Chinese Application No. 202310760113.0, mailed Jun. 24, 2025 (22 pages).

(Continued)

*Primary Examiner* — Michael Krofcheck

(57) ABSTRACT

A memory and an electronic device are provided in the present application. The memory includes a bank. The bank includes two planes. Each of the two planes includes a plurality of memory resources and a plurality of redundant replacement resources. A bad memory resource of one of the two planes is capable of being replaced by the redundant replacement resource of the other of the two planes for performing a normal Read/Write operation. By the above-mentioned way, the redundant replacement resources in different planes are capable of being shared, thereby improving the flexibility of redundancy and the yield of the memory.

18 Claims, 4 Drawing Sheets

(56) References Cited

U.S. PATENT DOCUMENTS

2014/0157087 A1* 6/2014 Yurzola .............. G06F 11/1012
                                                            714/773
2020/0183781 A1* 6/2020 Nakai ................. G06F 11/1068

FOREIGN PATENT DOCUMENTS

| CN | 102708927 A | 10/2012 |
| CN | 103247345 A | 8/2013 |
| CN | 106782666 A | 5/2017 |
| CN | 110739022 A | 1/2020 |
| CN | 111312319 A | 6/2020 |
| KR | 20010047329 A | 6/2001 |

OTHER PUBLICATIONS

Chinese Second Office Action, Chinese Application No. 202310760113.0, mailed Sep. 8, 2025 (19 pages).

* cited by examiner

MEMORY WITH REDUNDANT REPLACEMENT RESOURCES AND ELECTRONIC DEVICE

CROSS REFERENCE TO RELATED APPLICATIONS

The present application claims priority to Chinese Patent Application No. 202310760113.0, filed on Jun. 26, 2023, which is herein incorporated by reference in its entirety.

TECHNICAL FIELD

The present application relates to a technical field of memory technologies, and more particularly to a memory and an electronic device.

BACKGROUND

In a manufacturing process of a memory, especially of a dynamic random access memory (DRAM), there may be a defective memory cell (MC) in a row direction, which is unable to perform a storage operation normally, or there may be a defective memory cell in a column direction, which is unable to perform the storage operation normally as well. Therefore, in order to enhance a yield of the random access memory, it is necessary to provide some backup circuits and backup memory cells to replace the bad word lines, bit lines and memory cells. These backup circuits and backup memory cells are collectively referred to as redundancy (RDN) resources. Specifically, when there is a defective memory cell in the row direction and a redundancy in the row direction is necessary, this is referred to as a row redundancy. When there is a defective memory cell in the column direction and a redundancy in the column direction is necessary, this is referred to as a column redundancy.

With an ever-increasing storage capacity of the dynamic random access memory, an array of the memory is divided into a plurality of banks for easy access and control. A bank is divided into two adjacent planes, e.g., the first plane P0 and the second plane P1. A fixed number of redundancy resources are provided in one plane, for replacing bad memory resources in the corresponding plane. However, during the actual manufacturing process, occurrence probabilities and amounts of bad memory resources in the first plane P0 and the second plane P1 are different, which may lead to a situation in which one of the two planes has enough redundancy resources while the other does not.

SUMMARY OF THE DISCLOSURE

To solve the above-mentioned issues, a memory is provided in the present application. In the memory, the redundant replacement resources from different planes may be shared, thereby improving the flexibility of the replacement and the yield of the memory.

To solve the above-mentioned technical problem, one technical solution adopted by the present application is to provide a memory. The memory includes a bank. The bank includes two planes. Each of the two planes includes a plurality of memory resources and a plurality of redundant replacement resources. A bad memory resource of one of the two planes is capable of being replaced by a redundant replacement resource of the other of the two planes for performing normal Read/Write operations.

In some embodiments, at least one of the plurality of memory resources includes a plurality of common memory cells arranged in rows or columns, at least one of the plurality of redundant replacement resources includes a plurality of redundancy memory cells arranged in rows or columns. In response to any one of the plurality of memory resources including a bad common memory cell, the one memory resource is referred to a bad memory resource.

In some embodiments, at least one of the two planes has a capability of selectively operating at a first operating mode or a second operating mode. In response to one of the at least one plane of the two planes operating at the first operating mode, the bad memory resource in the one plane is capable of being replaced only by the redundant replacement resource in the same plane. In response to the one plane operating at the second operating mode, the bad memory resource in the one plane is capable of being replaced by the redundant replacement resource in the other of the two planes.

In some embodiments, in response to one plane of the two planes operating at the second operating mode, a first priority level of replacing the bad memory resource in the one plane of the two planes by the redundant replacement resource in a same plane of the two planes is greater than a second priority level of replacing the bad memory resource in the one plane of the two planes by the redundant replacement resource in a different plane of the two planes.

In some embodiments, at least one of the plurality of memory resources includes a column memory resource, at least one of the plurality of redundant replacement resources includes a column redundant replacement resource. The bank includes a column decoding circuits. In response to the mode signal being a first logic level, the column decoding circuit is only capable of enabling the column redundant replacement resource in one of the two planes, to replace the bad column memory resource in the same plane. In response to the mode signal being a second logic level, the column decoding circuit is capable of enabling the column redundant replacement resource in the one plane, to replace the bad column memory resource in the other one of the two planes. The first logic level is different from the second logic level.

In some embodiments, the column memory resource includes a common column strobe signal wire. The common column strobe signal wire is coupled to a plurality of common memory cells. The column redundant replacement resource includes a redundant column strobe signal wire. The redundant column strobe signal wire is coupled to a plurality of redundancy memory cells. The column decoding circuit enables, by enabling the replacement of the bad common column strobe signal wire by the redundant column strobe signal wire, the column redundant replacement resource to replace the bad column memory resource. The common column strobe signal wire that is coupled to the bad common memory cell is referred to a bad common column strobe signal wire.

In some embodiments, the memory includes an addressing circuit. The addressing circuit is coupled to the column decoding circuit. The addressing circuit, when performing a column addressing operation, compares the column addressing address with the bad mat address set. The addressing address is the address information, i.e., the information of the address to be addressed. The addressing circuit, in response to the column addressing address matching with any bad mat address in the bad mat address set, transmits a redundancy enabling message to the column decoding circuit, so as to enable the redundant column strobe signal wire.

In some embodiments, the memory includes a programmable memory circuit and a redundancy latch circuit. The programmable memory circuit is coupled to the redundancy latch circuit. The redundancy latch circuit is coupled to the addressing circuit, and is configured to transmit the bad mat address set to the addressing circuit. The mode signal is controlled by a trim bit in the programmable memory circuit.

In some embodiments, the bank includes a row decoding circuit. The row decoding circuit is coupled to the two planes respectively, and is arranged between the two planes.

In some embodiments, at least one of the two planes includes a plurality of sections. At least one of the plurality of sections includes a plurality of mats. At least one of the plurality of mats includes x memory resources and y redundant replacement resources. y is less than x.

To solve the above-mentioned technical problem, another technical solution adopted by the present application is to provide an electronic device. The electronic device includes a data memory circuit, a memory controller and a buffer memory. The data memory circuit includes at least one memory. The buffer memory is configured to temporarily store data generated by the memory controller, data output from the data memory circuit, or data that are to be stored in the data memory circuit. The memory controller is configured to control the data memory circuit and the buffer memory. At least one of the at least one memory includes a bank. The bank includes two planes. Each of the two planes includes a plurality of memory resources and a plurality of redundant replacement resources. A bad memory resource of one of the two planes is capable of being replaced by a redundant replacement resource of the other of the two planes for performing a normal Read/Write operation.

The beneficial effect of the embodiments of the present application is that: different from the related art, the memory provided in the present application includes a bank. The bank includes two planes. Each plane includes a plurality of memory resources and a plurality of redundant replacement resources. A bad memory resource of one of the two planes is capable of being replaced by a redundant replacement resource of the other of the two planes for performing the normal Read/Write operation. By means of the above-mentioned approach, the redundant replacement resources in different planes may be shared, thereby increasing the flexibility of replacement and the yield of the memory.

BRIEF DESCRIPTION OF THE DRAWINGS

In order to more clearly illustrate technical solutions in the present application, the drawings required in the description of the embodiments will be briefly introduced below. Obviously, the drawings in the following description are only some embodiments of the present application. For those of ordinary skills in the art, other drawings could be obtained based on these drawings without creative efforts. Among the drawings.

DETAILED DESCRIPTION

Figure 1:
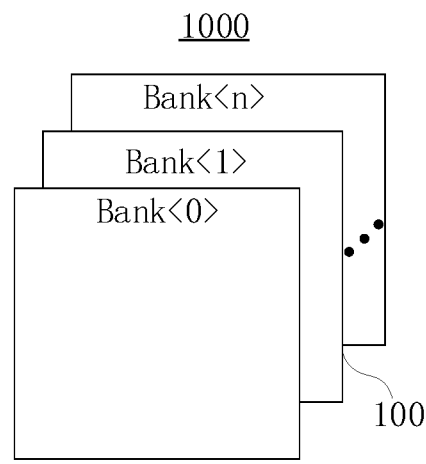
FIG. 1 is a schematic structural diagram of a memory according to an embodiment of the present application.

Technical solutions in embodiments of the present disclosure will be described clearly and thoroughly in connection with accompanying drawings of the embodiments of the present application. It should be appreciated that, the specific embodiments described herein are intended for explaining the present application only, and are not intended for limiting the present application. It should further be noted that, for ease of description, only part of the structure relevant to the present application, but not all of it, is illustrated in the accompanying drawings. All other embodiments by a person of ordinary skills in the art based on embodiments of the present disclosure without creative efforts shall all be within the protection scope of the present disclosure.

Reference to 'embodiments' herein means that, a specific feature, structure or characteristic described in conjunction with the embodiments may be included in at least one embodiment of the present application. The appearance of the phrase in various locations of the specification does not necessarily refer to the same embodiment, nor is it an independent or alternative embodiment mutually exclusive with other embodiments. Those skilled in the art may explicitly and implicitly understand that, the embodiments described herein may be combined with other embodiments.

The memory provided in the present application includes one or more banks. Each bank includes two planes. Each plane includes a plurality of memory resources and a plurality of redundant replacement resources. A bad memory resource of each of the two planes is capable of being replaced by a redundant replacement resource of the other of the two planes, such that normal Read/Write operation may be performed. By means of the above-mentioned approach, the redundant replacement resources in different planes may be shared, thereby increasing the flexibility of replacement and the yield of the memory.

In some embodiments, a memory includes one or more banks. Each bank includes two planes. Each of the two planes includes a plurality of memory resources and a plurality of redundant replacement resources. A bad memory resource of each of the two planes is capable of being replaced by a redundant replacement resource of the other of the two planes for performing a normal Read/Write operation.

In some embodiment, each of the plurality of memory resources includes a plurality of common memory cells arranged in rows or columns. Each of the plurality of redundant replacement resources includes a plurality of redundancy memory cells arranged in rows or columns. In response to one memory resource thereof including a bad common memory cell, the one memory resource is referred to a bad memory resource.

In some embodiment, each of the two planes has a capability of selectively operating at a first operating mode or a second operating mode. In response to the two planes operating at the first operating mode, the bad memory resource in one of the two planes is capable of being replaced only by the redundant replacement resource in the same plane. In response to the two planes operating at the second operating mode, the bad memory resource in one of the two planes is capable of being replaced by the redundant replacement resource in the other plane of the two planes.

In some embodiment, in response to the two planes operating at the second operating mode, a first priority level of replacing the bad memory resource in one of the two planes by the redundant replacement resource in a same plane of the two planes is greater than a second priority level of replacing the bad memory resource in the one of the two planes by the redundant replacement resource in a different plane of the two planes.

In some embodiment, each of the plurality of memory resources includes a column memory resource. Each of the plurality of redundant replacement resources includes a column redundant replacement resource. Each bank includes two column decoding circuits corresponding to the two planes respectively. In response to a mode signal being a first logic level, each of the two column decoding circuits is only capable of enabling the column redundant replacement resource in the corresponding one of the two planes to replace a bad column memory resource in the same plane. In response to the mode signal being a second logic level, each of the two column decoding circuits is capable of enabling the column redundant replacement resources in the corresponding one of the two planes, to replace the bad column memory resource in the other of the two planes. The first logic level is opposite to the second logic level.

In some embodiment, the column memory resource includes a common column strobe signal wire. The common column strobe signal wire is coupled to a plurality of common memory cells. The column redundant replacement resource includes a redundant column strobe signal wire. The redundant column strobe signal wire is coupled to a plurality of redundancy memory cells. The column decoding circuit enables, by enabling replacement of a bad common column strobe signal wire by the redundant column strobe signal wire, the column redundant replacement resource to replace the bad column memory resource. The common column strobe signal wire that is coupled to the bad common memory cell is referred to the bad common column strobe signal wire.

In some embodiment, the memory includes an addressing circuit. The addressing circuit is coupled to the two column decoding circuits corresponding to the two planes respectively. The addressing circuit, in response to performing a column addressing operation, compares a column addressing address with a bad mat address set. The addressing circuit, in response to the column addressing address matching with any bad mat address in the bad mat address set, transmits a redundancy enabling message to at least one of the two column decoding circuits, so as to enable the redundant column strobe signal wire.

In some embodiment, the memory includes a programmable memory circuit and a redundancy latch circuit. The programmable memory circuit is coupled to the redundancy latch circuit. The redundancy latch circuit is coupled to the addressing circuit, and is configured to transmit the bad mat address set to the addressing circuit. The mode signal is configured to be controlled by a trim bit in the programmable memory circuit.

In some embodiment, the bank includes a row decoding circuit. The row decoding circuit is coupled to the two planes respectively, and is arranged between the two planes.

In some embodiment, each of the two planes includes a plurality of sections. Each of the plurality of sections includes a plurality of mats. Each of the plurality of mats includes x memory resources and y redundant replacement resources. y is less than x.

As shown in FIG. 1, FIG. 1 is a schematic structural diagram of a memory according to an embodiment of the present application. The memory 1000 is a semiconductor component-based memory device. In the present embodiment, the memory 1000 is specifically a dynamic random access memory (DRAM). The memory 1000 includes one or more banks 100. In the present embodiment, the memory 1000 specifically includes at least one bank from bank Bank<0> to bank Bank<n>. n is a positive integer. In some embodiments, n may be 0. It should be appreciated that, with the ever-increasing storage capacity of the memory, for ease of access and control, the memory is formed as a stack of a plurality of banks, and Read/Write operation is performed on one of the banks at a time.

Figure 2:
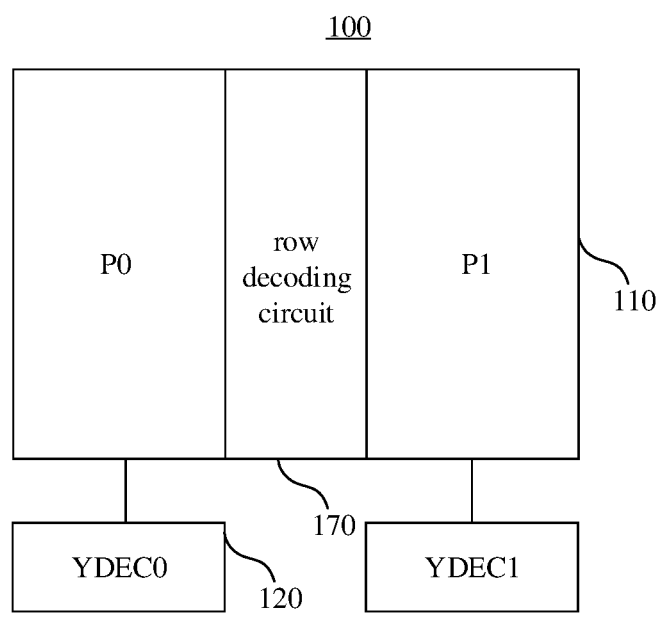
FIG. 2 is a schematic structural diagram of a bank according to an embodiment of the present application.

As shown in FIG. 2, FIG. 2 is a schematic structural diagram of a bank according to an embodiment of the present application. The bank 100 may include, but is not limited to, a plane 110, a column decoding circuit 120, and a row decoding circuit 170. The plane 110 includes a first plane P0 and a second plane P1. The column decoding circuit 120 includes a first column decoding circuit YDEC0 and a second column decoding circuit YDEC1. The row decoding circuit 170 is coupled to the first plane P0 and the second plane P1 respectively, and is provided between the first plane P0 and the second plane P1. The first column decoding circuit YDEC0 is coupled to the first plane P0, and the second column decoding circuit YDEC1 is coupled to the second plane P1. Each of the first plane P0 and the second plane P1 includes a plurality of memory resources and a plurality of redundant replacement resources. The row decoding circuit 170 is configured to enable the memory resource or the redundant replacement resource of the first plane P0 and the second plane P1 in the row direction. The first column decoding circuit YDEC0 is configured to enable the memory resource or the redundant replacement resource of the first plane P0 in the column direction. The second column decoding circuit YDEC1 is configured to enable the memory resource or the redundant replacement resource of the second plane P1 in the column direction. The corrupted or bad memory resource in one of the first plane P0 and the second plane P1 is capable of being replaced by the redundant replacement resource in the other of the first plane P0 and the second plane P1, so as to perform the normal storage operation. Specifically, the bad memory resource in the first plane P0 is capable of being replaced by the redundant replacement resource in the second plane P1, in order to perform the normal Read/wWrite operation. At the same time, the bad memory resource in the second plane P1 are capable of being replaced by the redundant replacement resource in the second plane P0, in order to perform the normal Read/Write operation. Each or at least one memory resource includes a plurality of common memory cells arranged in rows or columns. Each or at least one redundant replacement resource includes a plurality of redundant replacement resources arranged in rows or columns. Any one memory resource is referred to a bad common memory cell when the same has a bad common memory cell in it. Each of or at least one of the first plane P0 and the second plane P1 have the capability of selectively operating at a first operating mode or at a second operating mode. When the first plane P0 and the second plane P1 are operating at the first operating mode, the bad memory resource of one of the first plane P0 and the second plane P1 are replaced only by the redundant replacement resource in the same plane. When the first plane P0 and the second plane P1 are operating at the second operating mode, the bad memory resource of one of the first plane P0 and the second plane P1 is capable of being replaced by the redundant replacement resource of the other of the first plane P0 and the second plane P1. When one of the first plane P0 and the second plane P1 are operating at the second operating mode, a first priority level of replacing the bad memory resource in the one of the first plane P0 and the second plane P1 by the redundant replacement resource in a same plane of the two planes is greater than a second priority level of replacing the bad memory resource in the one of the first plane P0 and the second plane P1 by the redundant replacement resource in a different plane of the first plane P0 and the second plane P1. By this way, the redundant replacement resources in different planes may be shared, thereby improving the flexibility of replacement and the yield of the memory.

It should be appreciated that, in the manufacturing process of the memory, there may be a defective memory cell in the row direction, which cannot perform normal storage operation; or there may be a defective memory cell in the column direction, which cannot perform normal storage operation. Therefore, in order to enhance a yield of the random access memory, it is necessary to provide some backup circuits and backup memory cells to replace the bad word lines, bad bit lines and bad memory cells. These backup circuits and backup memory cells are collectively referred to as the redundant replacement resource. Specifically, when there is a defective memory cell in the row direction and a redundancy in the row direction is necessary, this kind of redundancy is referred to as a row redundancy. When there is a defective memory cell in the column direction and a redundancy in the column direction is necessary, this kind of redundancy is referred to as a column redundancy. An application of sharing the redundant replacement resources between the first plane P0 and the second plane P1 in the column redundancy technique is taken as an example in the present embodiment.

Figure 3:
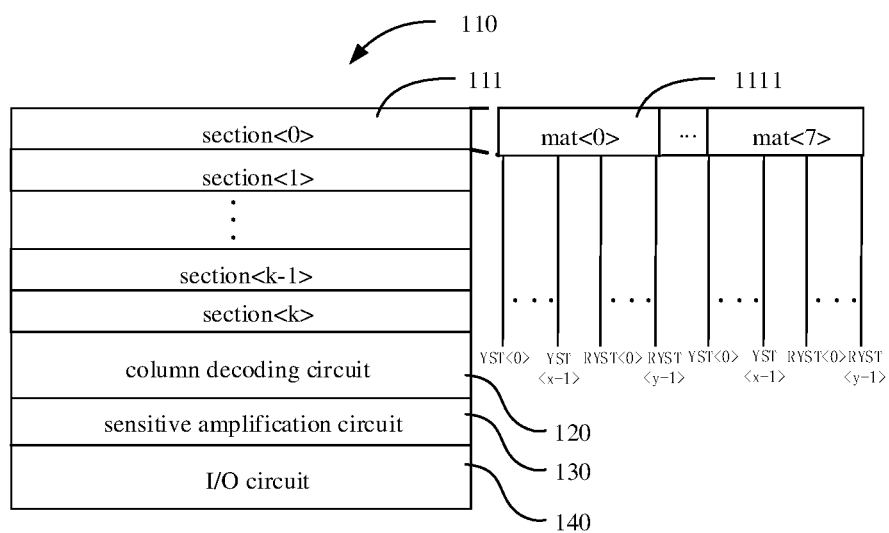
FIG. 3 is a schematic structural diagram of a plane according to an embodiment of the present application.

As shown in FIG. 3, FIG. 3 is a schematic structural diagram of a plane according to an embodiment of the present application. The plane 110 includes a plurality of sections 111. In this embodiment, the plane 110 includes (k+1) sections 111 arranged in a column sequentially along the up-down direction. Specifically, the plane 110 includes (k+1) sections 111 from a section section<0> to a section section<k>. K is a positive integer. Each or at least one section 111 includes a plurality of mats 1111. In this embodiment, each section 111 includes 8 mats 1111 arranged in a row sequentially along the right-left direction. Specifically, each section 111 includes 8 mats 1111 from a mat mat<0> to a mat mat<7>. When the memory 1000 performs the Read/Write operation, the Read/Write operation is performed on only one of the sections 111 at a time. Each mat 1111 outputs or writes 8 bits of data, then each section 111 outputs or writes 64 bits of data. Each or at least one mat 1111 includes x memory resources and y redundant replacement resources. x, y are positive integers and y is less than x. In some embodiments, the x memory resources include at least one common column strobe signal wire from a common column strobe signal wire YST<0> to a common column strobe signal wire YST<x-1>. The y redundant replacement resources include at least one redundant column strobe signal wire from a redundant column strobe signal wire RYST<0> to a redundant column strobe signal wire RYST<y-1>. The column decoding circuit 120 may decode the column addressing address and drive the corresponding common column strobe signal wire YST or the redundant column strobe signal wire RYST, to access the data in each or at least one memory mat 1111 of the section 111. The data in each or at least one memory mat 1111 may be amplified by the sensitive amplification circuit 130 and then output to the external world through the input and output (I/O) circuit 140.

Figure 4:
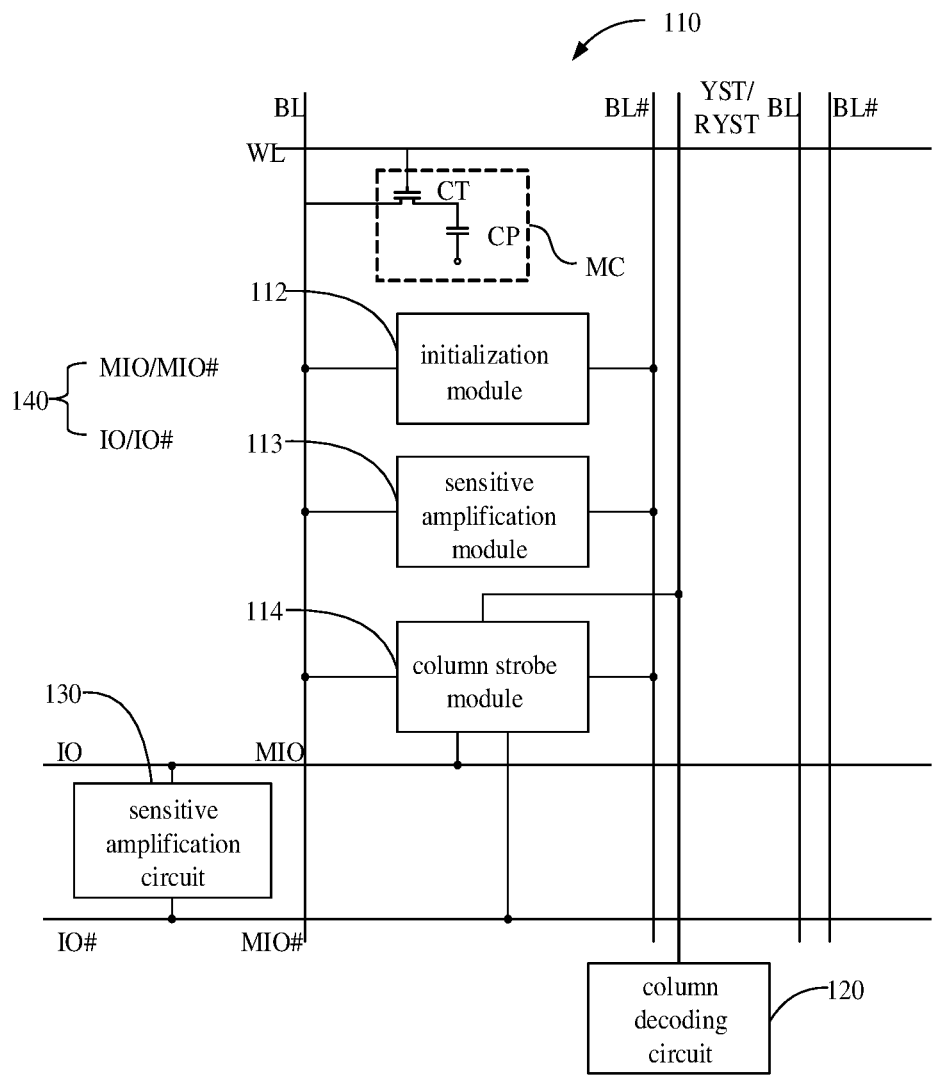
FIG. 4 is a schematic structural diagram of a plane according to another embodiment of the present application.

As shown in FIGS. 3 and 4, FIG. 4 is a schematic structural diagram of a plane according to another embodiment of the present application. The plane 110 includes a plurality of word lines WL, a plurality of complementary bit line pairs BL/BL #, and a plurality of memory cells MC. A plurality of memory cells MC include a plurality of common memory cells and a plurality of redundancy memory cell. Each or at least one memory cell MC is coupled to a word line WL and a complementary bit line pair BL/BL #. The complementary bit line pair BL/BL # includes a target bit line BL and a complementary bit line BL #. The memory cell MC includes a memory capacitor CP and an access switch CT. The memory capacitor CP is coupled between the access switch CT and the common terminal. The access switch CT is coupled between the memory capacitor CP and the target bit line BL. The control terminal of the access switch CT is coupled to the word line WL. The logical level 1 and the logical level 0 of the memory capacitor CP are determined or represented by the number of charges stored in the memory capacitor CP or by the value of the voltage difference between the two ends of the memory capacitor CP. The turning-on of the access switch CT enables reading and rewriting operation of the stored information in the memory capacitor CP. The turning-off of the access switch CT disables the reading and rewriting operation of the stored information in the memory capacitor CP. Specifically, the word line WL determines the turning-on or turning-off of the access switch CT. The bit line BL is the only channel for external access of the memory capacitor CP. When the access switch CT turns on, the reading and writing operation of the memory capacitor CP may be performed by the external party via the bit line BL.

The plane 110 further includes a plurality of initialization modules 112, a plurality of sensitive amplification modules 113 and a plurality of column strobe modules 114. Each or at least one initialization module 112 is coupled to a corresponding complementary bit line pair BL/BL #. In this way, during a pre-charging stage, the corresponding complementary bit line pair BL/BL # may be charged to an initialization potential by the initialization module 112. Each or at least one sensitive amplification module 113 is coupled to a corresponding complementary bit line pair BL/BL #. In this way, a signal amplification operation may be performed by the sensitive amplification module 113 on the corresponding complementary bit line pair BL/BL #. Each or at least one column strobe module 114 is coupled to a corresponding complementary bit line pair BL/BL #. Further, each or at least one column strobe module 114 is coupled to a common column strobe signal wire YST/redundant column strobe signal wire RYST. In this way, when the column decoding circuit 120 drives the common column strobe signal wire YST/redundant column strobe signal wire RYST, the complementary bit line pair BL/BL # is activated to communicate with a complementary intermediate I/O wire pair MIO/MIO #.

The I/O circuit 140 includes a plurality of complementary intermediate I/O wire pairs MIO/MIO # and a plurality of complementary I/O wire pairs IO/IO #. The complementary intermediate I/O wire pair MIO/MIO # is coupled to the complementary bit line pair BL/BL # via the column strobe module 114. The complementary intermediate I/O wire pair MIO/MIO # includes a target intermediate I/O wire MIO and a complementary intermediate I/O wire MIO #. The target intermediate I/O wire MIO is coupled to the target bit line BL via the column strobe module 114. The complementary intermediate I/O wire MIO # is coupled to the complementary bit line BL # via the column strobe module 114. It should be noted that, in some embodiments, the I/O circuit 140 further includes a plurality of complementary local I/O wire pairs LIO/LIO # (not illustrated in the figures), a plurality of complementary intermediate I/O wire pairs MIO/MIO # and a plurality of complementary I/O wire pairs IO/IO #. The complementary local I/O wire pair LIO/LIO # is coupled to the complementary bit line pair BL/BL # via the column strobe module 114. The coupling between the complementary local I/O wire pair LIO/LIO # and the complementary intermediate I/O wire pair MIO/MIO # is further controlled by a switch circuit (not illustrated in the figures).

When the Read/Write operation is performed on the memory 1000, the data in the memory cell MC to be accessed is first amplified by the sensitive amplification module 113, then the complementary bit line pair BL/BL # and the complementary intermediate I/O wire pair MIO/MIO # that corresponds to each other are enabled to be communicated with each other by the column strobe module 114. Next, the data in this memory cell MC is further amplified by the sensitive amplification circuit 130 and output to the corresponding complementary I/O wire pair IO/IO #. The sensitive amplification circuit 130 includes a plurality of secondary sensitive amplification modules. The secondary sensitive amplification module is configured to further amplify the data in the complementary intermediate I/O wire pair MIO/MIO # and then output the amplified data to the corresponding complementary I/O wire pair IO/IO #.

In some other embodiments, the I/O circuit 140 may further include a writing-drive module. The writing-drive module is configured to write external data into the memory cell MC.

Further, each or at least one column strobe module 114 is coupled to a corresponding complementary bit line pair BL/BL #, and each or at least one column strobe module 114 is coupled to a common column strobe signal wire YST/redundant column strobe signal wire RYST. In this way, when the column decoding circuit 120 drives the common column strobe signal wire YST/redundant column strobe signal wire RYST, the complementary bit line pair BL/BL # is enabled to communicate with a complementary intermediate I/O wire pair MIO/MIO #. In some embodiments, a common column strobe signal wire YST/redundant column strobe signal wire RYST is coupled to 8 column strobe modules 114.

In some embodiments, when the first plane P0 and the second plane P1 operate at the second operating mode, when the memory cell MC corresponding to the common column strobe signal wire YST of one of the first plane P0 and the second plane P1 fails, becomes a bad common memory cell and is unable to be read or written, the memory cell MC may be replaced by a memory cell MC (a redundancy memory cell) corresponding to the redundant column strobe signal wire RYST of the other of the first plane P0 and the second plane P1. In this way, the yield of the memory is increased.

Figure 5:
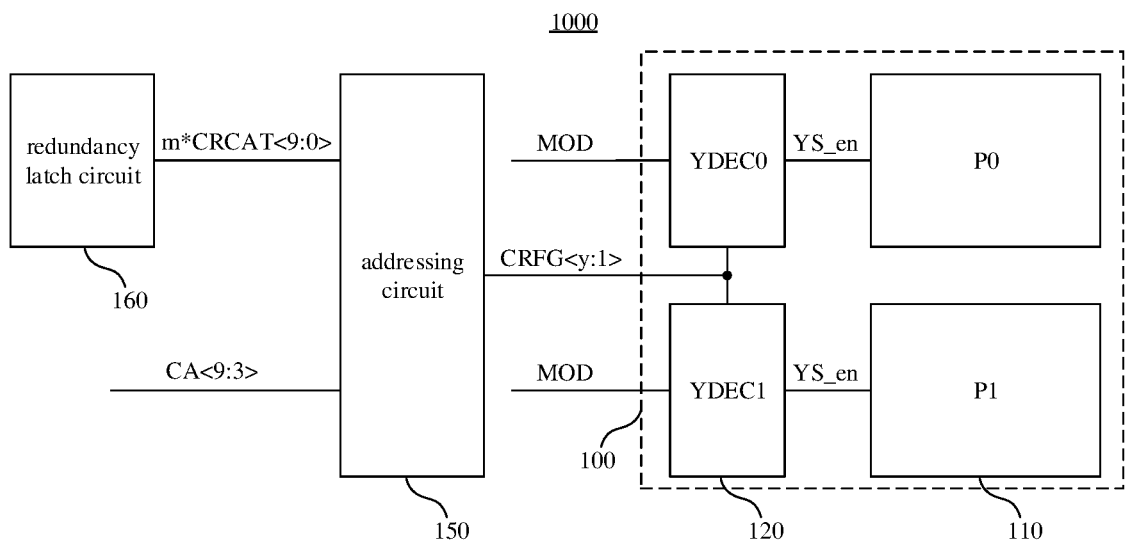
FIG. 5 is a schematic structural diagram of a memory according to another embodiment of the present application.

As shown in FIGS. 3, 4 and 5, FIG. 5 is a schematic structural diagram of a memory according to another embodiment of the present application. The memory 1000 may include, but is not limited to, the bank 100, an addressing circuit 150, and a redundancy latch circuit 160. The bank 100 may include, but is not limited to, the first plane P0, the second plane P1, the first column decoding circuit YDEC0 and the second column decoding circuit YDEC1. The memory resource in the first plane P0 and the second plane P1 includes the column memory resource. The column memory resource includes the common column strobe signal wire YST. In some embodiments, the column memory resource specifically includes the common column strobe signal wire YST<0> to the common column strobe signal wire YST<x−1>. Each or at least one common column strobe signal wire YST is coupled to a plurality of common memory cells. The redundant replacement resource in the first plane P0 and the second plane P1 includes the column redundant replacement resource. The column redundant replacement resource includes the redundant column strobe signal wire RYST. The column redundant replacement resource specifically includes the redundant column strobe signal wire RYST<0> to the redundant column strobe signal wire RYST<y−1>. Each or at least one redundant column strobe signal wire RYST is coupled to a plurality of redundancy memory cells. The common column strobe signal wire YST that is coupled to a bad common memory cell is defined as or referred to as a bad common column strobe signal wire. By enabling the bad common column strobe signal wire to be replaced by the redundant column strobe signal wire RYST, the first column decoding circuit YDEC0 and/or the second column decoding circuit YDEC1 enables the bad column memory resource to be replaced by the column redundant replacement resource.

Specifically, the first column decoding circuit YDEC0 corresponds to the first plane P0, and is configured to enable the common column strobe signal wire YST or the redundant column strobe signal wire RYST in the first plane P0 to access the memory cell MC. The second decoding circuit YDEC1 corresponds to the second plane P1, and is configured to enable the common column strobe signal wire YST or the redundant column strobe signal wire RYST in the second plane P1 to access the memory cell MC. In response to the mode signal MOD being a first logic level, the first column decoding circuit YDEC0 may enable only the column redundant replacement resource (the redundant column strobe signal wire RYST) in the first plane P0 to replace the bad column memory resource (bad common column strobe signal wire YST) in the first plane P0; and the second column decoding circuit YDEC1 may enable only the column redundant replacement resource (the redundant column strobe signal wire RYST) in the second plane P1 to replace the bad column memory resource (the bad common column strobe signal wire YST) in the second plane P1. In response to the mode signal MOD being a second logic level, the first column decoding circuit YDEC0 may enable the column redundant replacement resource (the redundant column strobe signal wire RYST) in the first plane P0 to replace the bad column memory resource (the bad common column strobe signal wire YST) in the second plane P1, and the second column decoding circuit YDEC1 may enable the column redundant replacement resource (the redundant column strobe signal wire RYST) in the second plane P1 to replace the bad column memory resource (the bad common column strobe signal wire YST) in the first plane P0. The first logic level is opposite to the second logic level. In some embodiments, the first logic level is a logic high level, and the second logic level is a logic low level. In this way, when the first plane P0 and the second plane P1 are operating at the second operating mode, the column redundant replacement resource in one of the first plane P0 and the second plane P1 is capable of being shared with the other of the first plane P0 and the second plane P1, which makes the redundancy more flexible and thereby improving the yield of the memory 1000.

Further, the addressing circuit 150 is coupled to the first column decoding circuit YDEC0 and the second column decoding circuit YDEC1. When performing the column addressing operation, the addressing circuit 150 compares the column addressing address CA<9:3> with the bad mat address set m*CRCAT<9:0>, and in response to the column addressing address CA<9:3> matching with any of the bad mat addresses in the bad mat address set m*CRCAT<9:0>, the addressing circuit 150 may transmit the redundancy enabling message CRFG<y:1> to the column decoding circuit 120, so as to enable the redundant column strobe signal wire RYST. m is a positive integer. Specifically, the column addressing address CA<9:3> is compared with any of the bad mat addresses in the bad mat address set m*CRCAT<9:0> bit by bit. In some embodiments, when each bit of the column addressing address CA<9:3> is identical to the corresponding bit of the bad mat address, the column addressing address CA<9:3> matches the bad mat address, the addressing circuit 150 generates the redundancy enabling message CRFG<y:1> and transmits the same to the column decoding circuit 120. In response to the mode signal MOD being the first logic level, the first column decoding circuit YDEC0 or the second column decoding circuit YDEC1 responds to the redundancy enabling message CRFG<y:1> and enables the corresponding redundant column strobe signal wire RYST in the corresponding plane 110 via the column strobe enabling signal YS_en, so as to access the corresponding redundancy memory cell. In this way, the corresponding bad common column strobe signal wire YST of the same plane 110 is replaced, and the normal storage operation can be achieved. In response to the mode signal MOD being the second logic level, the first column decoding circuit YDEC0 or the second column decoding circuit YDEC1 responds to the redundancy enabling message CRFG<y: 1> and is able to enable the corresponding redundant column strobe signal wire RYST in the corresponding plane 110 via the column strobe enabling signal YS_en, so as to access the corresponding redundancy memory cell. In this way, the corresponding bad common column strobe signal wire YST of the other plane 110 is replaced, and the normal storage operation can be achieved.

Additionally, the memory 1000 may further include a programmable memory circuit (not illustrated in the figures) . The programmable memory circuit is coupled to the redundancy latch circuit 160. The bad mat address set m*CRCAT<9:0> is stored in the programmable memory circuit. When the programmable memory circuit is powered on, the bad mat address set m*CRCAT<9:0> is transmitted to the redundancy latch circuit 160. The redundancy latch circuit 160 is coupled to the addressing circuit 150, so as to transmit the bad mat address set m*CRCAT<9:0> to the addressing circuit 150. The mode signal MOD is controlled by a trim bit in the programmable memory circuit. In some embodiments, when the trim bit in the programmable memory circuit is 1, the mode signal MOD is the first logic level, and when the trim bit in the programmable memory circuit is 0, the mode signal MOD is the second logic level.

The memory 1000 provided in the present application includes one or more banks 100. Each or at least one bank 100 includes two planes 110. Each or at least one plane 110 includes a plurality of memory resources and a plurality of redundant replacement resources. The bad memory resource of the plane 110 is capable of being replaced by the redundant replacement resource of the other plane 110 for performing normal Read/Write operations. By the above-mentioned manner, the redundant replacement resources in different planes 110 can be shared, thereby improving the flexibility of replacement and the yield of the memory 1000.

Figure 6:
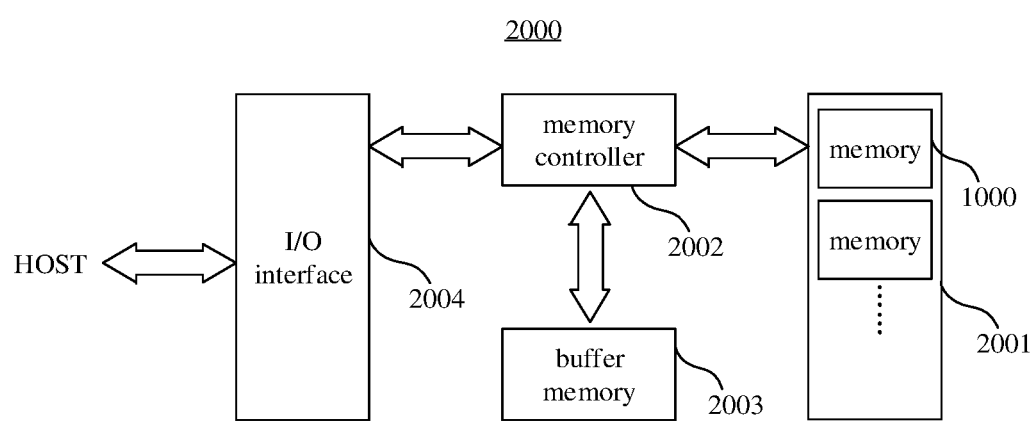
FIG. 6 is a schematic structural diagram of an electronic device according to an embodiment of the present application.

As shown in FIG. 6, FIG. 6 is a schematic structural diagram of an electronic device according to an embodiment of the present application. The electronic device 2000 may include, but is not limited to, a data memory circuit 2001, a memory controller 2002, a buffer memory 2003, and an I/O interface 2004.

Based on a control signal generated by the memory controller 2002, the data memory circuit 2001 may store the data output by the memory controller 2002 or output the stored data to the memory controller 2002.

The data memory circuit 2001 may include at least one memory 1000. The data memory circuit 2001 may also include non-volatile memory capable of retaining the stored data when the power is off. The non-volatile memory may be an NOR flash memory or an NAND flash memory, a phase change random access memory (PRAM), a resistance random access memory (RRAM), a spin transfer torque random access memory (STTRAM) and a magnetic random access memory (MRAM).

The memory controller 2002 may receive an instruction from an external device via the I/O interface 2004, and may interpret the instruction to control the performing of the operation that inputs data to the data memory circuitry 2001 or the buffer memory 2003, or to control the performing of the operation that outputs data stored in the data memory circuitry 2001 or the buffer memory 2003. In some embodiments, the external device may be a host device. The memory controller 2002 may be configured to control a data memory circuit 2001 including a non-volatile memory and a buffer memory 2003 including a volatile memory.

The buffer memory 2003 is configured to temporarily store data generated by the memory controller 2002. In other words, the buffer memory 2003 is configured to temporarily store data output from the data memory circuit 2001, or data that are to be stored in the data memory circuit 2001. The buffer memory 2003 may be configured to store, based on the control signal, the data output from the memory controller 2002. Additionally, the buffer memory 2003 may be further configured to read and output the data stored in the memory controller 2002. The buffer memory 2003 may include a volatile random access memory, such as a dynamic random access memory (DRAM), a mobile memory, or a solid state random access memory (SRAM).

The I/O interface 2004 is configured to be physically connected to and be electrically connected to the memory controller 2002 and the external device. The external device may be a host computer. Therefore, the memory controller 2002 may receive the instruction and data from the external device via the I/O interface 2004. The memory controller 2002 may also be configured to output the data generated by itself to the external device via the I/O interface 2004. In other words, the electronic device 2000 may exchange data with the external device via the I/O interface 2004. The I/O interfaces 2004 may include any of the following interfaces, such as a universal serial bus (USB), an multi-media card (MMC), a peripheral component interconnect express (PCI-E), a serial attached SCSI (SAS), a serial advanced technology attachment (SATA), a parallel advanced technology attachment (PATA), a small computer system interface (SCSI), an enhanced small device interface (ESDI), and an integrated drive electronic (IDE).

The electronic device 2000 may be configured as an auxiliary storage device for the host computer or as an external memory device. The electronic device 2000 may include a solid state disk (SSD), a USB memory, a secure digital (SD) card, a mini secure digital (mSD) card, a micro secure digital (micro-SD) card, a secure digital high capacity (SDHC) card, a memory stick card, a smart media (SM) card, a multi-media card (MMC), an embedded multi-media card (eMMC) and a standard flash memory card.

The above are only implementations of the present application, and do not limit the patent scope of the present disclosure. Any equivalent changes to the structure or processes made by the description and drawings of this application or directly or indirectly used in other related technical field are included in the protection scope of this application.

What is claimed is:

1. A memory, comprising:
a bank, the bank comprises two planes, wherein each of the two planes comprises a plurality of memory resources and a plurality of redundant replacement resources; and
a bad memory resource of one of the two planes is capable of being replaced by a redundant replacement resource of an other of the two planes for performing a normal Read/Write operation,
at least one of the plurality of memory resources comprises a column memory resource, at least one of the plurality of redundant replacement resources comprises a column redundant replacement resource;
the bank comprises a column decoding circuit;
in response to a mode signal being a first logic level, the column decoding circuit is only capable of enabling the column redundant replacement resource in one of the two planes to replace a bad column memory resource in a same plane;
in response to the mode signal being a second logic level, the column decoding circuit is capable of enabling the column redundant replacement resources in the one of the two planes to replace the bad column memory resource in an other of the two planes; and
the first logic level is different from the second logic level.

2. The memory as claimed in claim 1, wherein
at least one of the plurality of memory resources comprises a plurality of common memory cells arranged in rows or columns,
at least one of the plurality of redundant replacement resources comprises a plurality of redundancy memory cells arranged in rows or columns, and
in response to any one memory resource thereof comprising a bad common memory cell,
the one memory resource is referred to a bad memory resource.

3. The memory as claimed in claim 1, wherein
at least one of the two planes has a capability of selectively operating at a first operating mode or a second operating mode;
in response to one of the at least one of the two planes operating at the first operating mode,
the bad memory resource in the one of the two planes is capable of being replaced only by the redundant replacement resource in a same plane; and
in response to the one of the two planes operating at the second operating mode, the bad memory resource in the one of the two planes is capable of being replaced by the redundant replacement resource in the other of the two planes.

4. The memory as claimed in claim 3, wherein
in response to the one of the two planes operating at the second operating mode, a first priority level of replacing the bad memory resource in the one of the two planes by the redundant replacement resource in a same plane of the two planes is greater than a second priority level of replacing the bad memory resource in the one of the two planes by the redundant replacement resource in a different plane of the two planes.

5. The memory as claimed in claim 1, wherein
the column memory resource comprises a common column strobe signal wire, the common column strobe signal wire is coupled to a plurality of common memory cells,
the column redundant replacement resource comprises a redundant column strobe signal wire, the redundant column strobe signal wire is coupled to a plurality of redundancy memory cells,
the column decoding circuit enables, by enabling replacement of a bad common column strobe signal wire by the redundant column strobe signal wire, the column redundant replacement resource to replace the bad column memory resource; and
the common column strobe signal wire that is coupled to the bad common memory cell is referred to the bad common column strobe signal wire.

6. The memory as claimed in claim 5, wherein
the memory comprises an addressing circuit, the addressing circuit is coupled to the column decoding circuit;
the addressing circuit, in response to performing a column addressing operation, compares a column addressing address with a bad mat address set, and
the addressing circuit, in response to the column addressing address matching with any bad mat address in the bad mat address set, transmits a redundancy enabling message to the column decoding circuit, so as to enable the redundant column strobe signal wire.

7. The memory as claimed in claim 6, wherein
the memory comprises a programmable memory circuit and a redundancy latch circuit,
the programmable memory circuit is coupled to the redundancy latch circuit,
the redundancy latch circuit is coupled to the addressing circuit, and is configured to transmit the bad mat address set to the addressing circuit; and
the mode signal is configured to be controlled by a trim bit in the programmable memory circuit.

8. The memory as claimed in claim 1, wherein
the bank comprises a row decoding circuit,
the row decoding circuit is coupled to the two planes respectively, and is arranged between the two planes.

9. The memory as claimed in claim 1, wherein
at least one of the two planes comprises a plurality of sections, at least one of the plurality of sections comprises a plurality of mats, at least one of the plurality of mats comprises x memory resources and y redundant replacement resources,
wherein y is less than x.

10. An electronic device, comprising:
a data memory circuit, comprising at least one memory;
a memory controller; and
a buffer memory, configured to temporarily store data generated by the memory controller,
data output from the data memory circuit, or data be stored in the data memory circuit;
wherein the memory controller is configured to control the data memory circuit and the buffer memory;
wherein at least one of the at least one memory comprises:
a bank, the bank comprises two planes, wherein each of the two planes comprises a plurality of memory resources and a plurality of redundant replacement resources; and
a bad memory resource of one of the two planes is capable of being replaced by a redundant replacement resource of an other of the two planes for performing a normal Read/Write operation, wherein at least one of the plurality of memory resources comprises a column memory resource, at least one of the plurality of redundant replacement resources comprises a column redundant replacement resource;
the bank comprises a column decoding circuit;
in response to a mode signal being a first logic level, the column decoding circuit is only capable of enabling the column redundant replacement resource in one of the two planes to replace the bad column memory resource in a same plane;
in response to the mode signal being a second logic level, the column decoding circuit is capable of enabling the column redundant replacement resources in the one of the two planes to replace the bad column memory resource in an other of the two planes; and
the first logic level is different from the second logic level.

11. The electronic device as claimed in claim 10, wherein
at least one of the plurality of memory resources comprises a plurality of common memory cells arranged in rows or columns,
at least one of the plurality of redundant replacement resources comprises a plurality of redundancy memory cells arranged in rows or columns, and
in response to one memory resource thereof comprising a bad common memory cell, the one memory resource is referred to a bad memory resource.

12. The electronic device as claimed in claim 10, wherein
at least one of the two planes has a capability of selectively operating at a first operating mode or a second operating mode;
in response to one of the at least one of the two planes operating at the first operating mode, the bad memory resource in the one plane is capable of being replaced only by the redundant replacement resource in a same plane; and
in response to the one of the two planes operating at the second operating mode, the bad memory resource in the one of the two planes is capable of being replaced by the redundant replacement resource in the other of the two planes.

13. The electronic device as claimed in claim 12, wherein
in response to the one of the two planes operating at the second operating mode, a first priority level of replacing the bad memory resource in the one of the two planes by the redundant replacement resource in a same plane of the two planes is greater than a second priority level of replacing the bad memory resource in the one of the two planes by the redundant replacement resource in a different plane of the two planes.

14. The electronic device as claimed in claim 10, wherein
the column memory resource comprises a common column strobe signal wire, the common column strobe signal wire is coupled to a plurality of common memory cells,
the column redundant replacement resource comprises a redundant column strobe signal wire, the redundant column strobe signal wire is coupled to a plurality of redundancy memory cells,
the column decoding circuit enables, by enabling replacement of a bad common column strobe signal wire by the redundant column strobe signal wire, the column redundant replacement resource to replace the bad column memory resource; and
the common column strobe signal wire that is coupled to the bad common memory cell is referred to the bad common column strobe signal wire.

15. The electronic device as claimed in claim 14, wherein
the memory comprises an addressing circuit, the addressing circuit is coupled to the column decoding circuit;
the addressing circuit, in response to performing a column addressing operation, compares a column addressing address with a bad mat address set, and
the addressing circuit, in response to the column addressing address matching with any bad mat address in the bad mat address set, transmits a redundancy enabling message to of the column decoding circuit, so as to enable the redundant column strobe signal wire.

16. The electronic device as claimed in claim 15, wherein
the memory comprises a programmable memory circuit and a redundancy latch circuit,
the programmable memory circuit is coupled to the redundancy latch circuit,
the redundancy latch circuit is coupled to the addressing circuit, and is configured to transmit the bad mat address set to the addressing circuit; and
the mode signal is configured to be controlled by a trim bit in the programmable memory circuit.

17. The electronic device as claimed in claim 10, wherein
the bank comprises a row decoding circuit,
the row decoding circuit is coupled to the two planes respectively, and is arranged between the two planes.

18. The electronic device as claimed in claim 10, wherein
at least one of the two planes comprises a plurality of sections, at least one of the plurality of sections comprises a plurality of mats, at least one of the plurality of mats comprises x memory resources and y redundant replacement resources,
wherein y is less than x.

* * * * *